J. Hamilton,
Drag Saw,
Nº 25,113.
Patented Aug. 16, 1859.
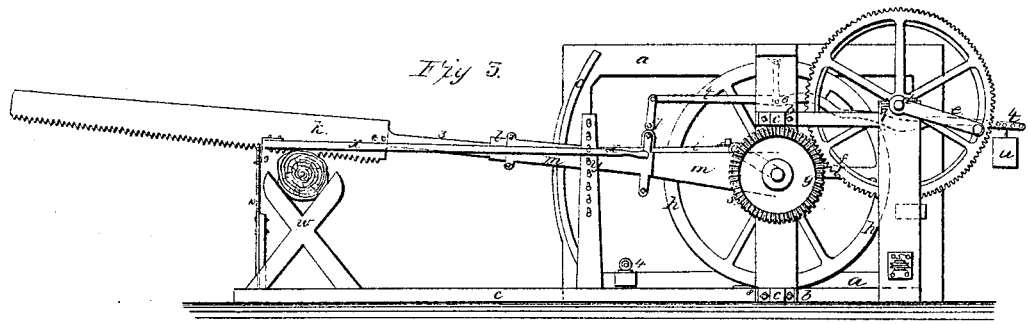
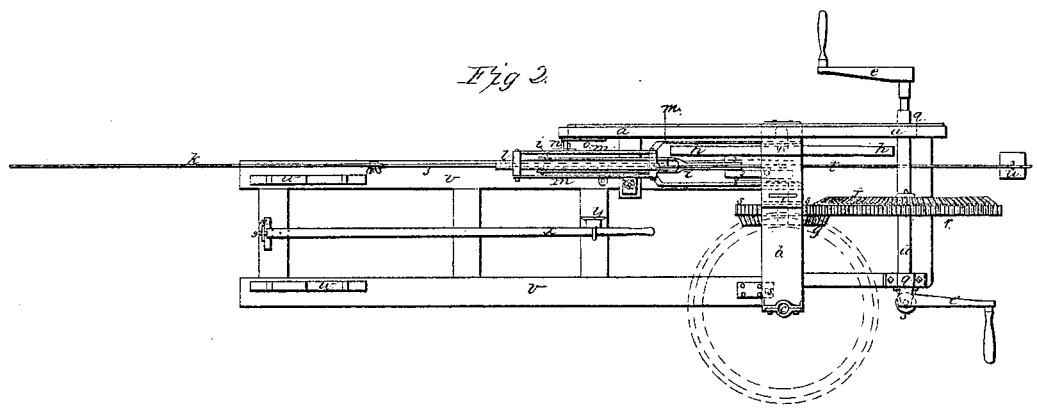
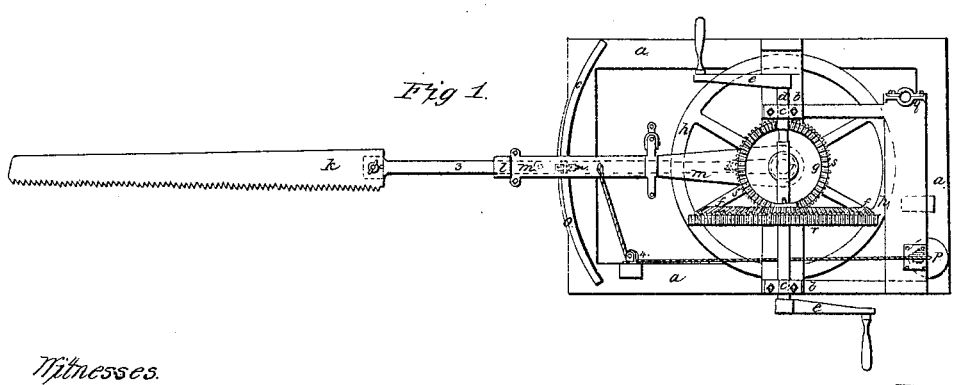
Witnesses.
Lemuel W. Serrell
Chas H Smith
Inventor.
James Hamilton

UNITED STATES PATENT OFFICE.

JAMES HAMILTON, OF NEW YORK, N. Y.

CROSSCUT-SAWING MACHINE.

Specification of Letters Patent No. 25,113, dated August 16, 1859.

*To all whom it may concern:*

Be it known that I, JAMES HAMILTON, of the city and State of New York, have invented, made, and applied to use certain new and useful Improvements in Machinery for Sawing; and I do hereby declare that the following is a full, clear, and exact description of the construction and operation of the same, reference being had to the annexed drawing, making part of this specification, wherein—

Figure 1, is a plan of my machine as adapted to horizontal sawing such as felling trees. Fig. 2, is a plan and Fig. 3 is a side elevation of the same machine as changed for sawing vertically such as cutting up logs, fire wood, &c.

Similar marks of reference indicate the same parts.

For clearing timber land an apparatus is very much needed that will saw horizontally for felling the trees, or can be changed with great facility for vertical sawing such as dividing the logs up into short lengths and sawing fire wood; and said apparatus requires to be very light for transportation.

The nature of my invention consists in so constructing and arranging the parts that give motion to a saw, that the same can be changed in a few minutes from a horizontal to a vertical sawing machine, thereby accomplishing by one machine all the purposes which have heretofore been attained by two separate machines, and at the same time my machine is very cheap, light, and durable.

In the accompanying drawing $a$, $a$, is a suitable framework of light strong wood receiving on standards $b$, $b$, journal boxes $c$, $c$, sustaining the shaft $d$, at the ends of which are cranks $e$, $e$, by which manual power is to be applied to rotate the shaft $d$, and drive the machinery. On this shaft $d$, is a bevel gear wheel $f$, taking a bevel pinion $g$, as seen in Fig. 1. This bevel pinion $g$, is on the end of the short vertical shaft 1 that is supported in journals in the frame $a$, and is formed with a crank 2, adjoining the fly wheel $h$, and from this crank 2, is a forked pitman $i$, that gives motion to the sliding bar 3, and the saw $k$, that is attached at its end. The sliding bar 3, moves in a box $l$, connected by straps $m$, $m$, to the journals surrounding the shafts 1, so that said saw can describe a curve from said shaft 1, as a center as the cutting progresses. The weight of the box $l$ and straps $m$, $m$, and saw $k$ are sustained on a roller $n$, that travels on an arc $o$, attached to the frame $a$, as the sawing progresses. The saw may be kept to its work by a weight $p$, and cord passing over pulleys 4, 5, and connected to the straps $m$. In this position my machine is adapted to felling trees, an awl driven into the tree or similar means being used as a guide for the saw in commencing to cut, and the saw being followed by a wedge or wedges as usual.

My machine as thus constructed is very simple, efficient, light and applies the power very directly to the saw, but if this alone were used my apparatus would not accomplish all the purposes required of such machinery, and would contain little or no novelty; I therefore construct my machine with a second pair of journal boxes $q$, $q$, in such a position as to receive the shaft $d$, at right angles to its former position and so that the machine can be turned up onto its side as seen in Figs. 2 and 3, so as to saw vertically. When the shaft $d$, is changed and placed in the boxes $q$, $q$, a gear wheel $r$, adjoining the bevel wheel $f$, takes into a smaller gear or pinion $s$, at the base of the bevel gear $g$, on the shaft 1, and when said shaft $d$, is rotated by the cranks $e$, $e$, the saw $k$, is given a vibrating motion as before. In this case the saw acting vertically would have too much weight resting on it from the box $l$, and straps $m$, $m$, &c. I therefore make use of a lever $t$, hung on a fulcrum 6, and connected at 7, to the box $m$, and provided with an adjustable weight $u$, by which more or less weight can be taken off the saw, and said lever $r$, also serves the purpose of lifting the saw out of its kerf or elevating the same when necessary.

In order to adapt my machine for sawing up small logs for fire wood I attach a frame $v$, $v$, to the frame $a$, by a plate and bolts as at 8, 8, and on said frame a buck $w$, is placed in such a position that the saw $k$ moves vertically at its side, and into this buck I lay the log to be sawed; to hold the said log in place I make use of a lever $x$, on the short end of which a hook 9, is attached which I insert in one of the holes of a vertical perforated plate 10, and press the other end of the lever down beneath pins in a vertical standard $y$.

Having thus described my invention I would remark that I do not claim the manner of fitting or moving the saw as that is well known, but

What I claim as my invention and desire to secure by Letters Patent is—

1. The manner herein described of arranging the shaft $d$, and its gear wheel $f$ and bevel gear $r$, in connection with the bevel gear $g$ and gear $s$, on the shaft 1, so that said shaft $d$, can be changed to stand horizontally and give motion to the saw whether the said saw and the gearing thereof be in a horizontal or vertical position substantially as specified, thereby adapting one machine to be moved by hand in felling trees or sawing up logs as set forth.

2. I also claim in combination with the aforesaid machine for sawing logs, the detachable frame $v$, buck $w$, and variable lever $x$, for holding smaller logs while being sawed for fire wood substantially as specified.

In witness whereof I have hereunto set my signature this twenty sixth day of July 1857.

JAMES HAMILTON.

Witnesses:
LEMUEL W. SERRELL,
CHAS. H. SMITH.